(12) United States Patent
Wertich et al.

(10) Patent No.: US 10,899,288 B2
(45) Date of Patent: Jan. 26, 2021

(54) INSERTION FLOOR FOR COVERING A STORAGE OR LUGGAGE COMPARTMENT, PREFERABLY IN A MOTOR VEHICLE

(71) Applicant: Bayerische Motoren Werke Aktiengesellschaft, Munich (DE)

(72) Inventors: Bastien Wertich, Munich (DE); Walter Fleischer, Neufahrn b. Freising (DE); Joerg Wichert, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 15/889,728

(22) Filed: Feb. 6, 2018

(65) Prior Publication Data

US 2018/0162292 A1     Jun. 14, 2018

Related U.S. Application Data (63) Continuation of application No. PCT/EP2016/068533, filed on Aug. 3, 2016.

(30) Foreign Application Priority Data

Aug. 7, 2015  (DE) .................. 10 2015 215 181

(51) Int. Cl.
*B60R 13/01* (2006.01)
*B60R 5/04* (2006.01)
(Continued)

(52) U.S. Cl.
CPC .............. *B60R 13/013* (2013.01); *B60R 5/04* (2013.01); *B60R 5/044* (2013.01); *B60R 11/06* (2013.01); *B62D 43/06* (2013.01)

(58) Field of Classification Search
CPC ......... B60R 13/013; B60R 11/06; B60R 5/04; B60R 5/044; B62D 43/06
See application file for complete search history.

(56) References Cited

U.S. PATENT DOCUMENTS

| 5,058,237 A | 10/1991 | Mahr |
| 7,281,742 B2 * | 10/2007 | Porter, II ................. B60R 5/04 296/24.4 |

FOREIGN PATENT DOCUMENTS

| DE | 26 47 104 A1 | 4/1978 |
| DE | 197 23 838 A1 | 1/1998 |

(Continued)

OTHER PUBLICATIONS

International Search Report (PCT/ISA/210) issued in PCT Application No. PCT/EP2016/068533 dated Nov. 23, 2016 with English translation (eight pages).

(Continued)

*Primary Examiner* — D Glenn Dayoan
*Assistant Examiner* — Melissa Ann Bonifazi
(74) *Attorney, Agent, or Firm* — Crowell & Moring LLP (57) ABSTRACT

An insertion floor is provided for covering a storage or luggage compartment, preferably in a motor vehicle, wherein the insertion floor is pivotably supported on a holder by locking hinges and wherein the locking hinges hold the insertion floor at least in a position in which the storage or luggage is accessible. In order to create such an insertion floor that can be economically produced, consists of few individual parts, and also can be installed and removed quickly and easily by the user, the insertion floor can be removed from the holder.

18 Claims, 9 Drawing Sheets

(51) Int. Cl.
*B62D 43/06* (2006.01)
*B60R 11/06* (2006.01)

(56) References Cited

FOREIGN PATENT DOCUMENTS

| | | |
|---|---|---|
| DE | 197 35 439 A1 | 2/1999 |
| DE | 60 2004 001 342 T2 | 5/2007 |
| DE | 10 2008 030 384 A1 | 2/2009 |
| EP | 0 419 883 A1 | 8/1990 |
| EP | 1 447 278 A2 | 8/2004 |
| GB | 2505662 A | 3/2014 |
| JP | 2009-241744 A | 10/2009 |
| JP | 2011-56983 A | 3/2011 |
| KR | 10-1446233 B1 | 10/2014 |
| WO | WO 2004/074044 A1 | 9/2004 |

OTHER PUBLICATIONS

German-language Written Opinion (PCT/ISA/237) issued in PCT Application No. PCT/EP2016/068533 dated Nov. 23, 2016 (five pages).

German-language Search Report issued in counterpart German Application No. 10 2015 215 181.6 dated Dec. 9, 2015 with partial English translation (12 pages).

English translation of Chinese-language Office Action issued in Chinese Application No. 201680043623.4 dated Mar. 31, 2020 (seven (7) pages).

* cited by examiner

INSERTION FLOOR FOR COVERING A STORAGE OR LUGGAGE COMPARTMENT, PREFERABLY IN A MOTOR VEHICLE

CROSS REFERENCE TO RELATED APPLICATIONS

This application is a continuation of PCT International Application No. PCT/EP2016/068533, filed Aug. 3, 2016, which claims priority under 35 U.S.C. § 119 from German Patent Application No. 10 2015 215 181.6, filed Aug. 7, 2015, the entire disclosures of which are herein expressly incorporated by reference.

BACKGROUND AND SUMMARY OF THE INVENTION

The invention relates to an insertion floor for covering a storage or luggage compartment, preferably in a motor vehicle, wherein the insertion floor is pivotably supported on a holder by use of locking hinges and wherein the locking hinges hold the insertion floor at least in a position in which the storage or luggage compartment is accessible.

As a consequence of ongoing technical developments for vehicle tires, fewer and fewer motor vehicles carry along spare tires. Therefore, the spare wheel cavity is no longer required to hold the spare wheel, but instead this area can be utilized as an additional storage or luggage compartment. For an ergonomical loading of this area, which is usually covered by a pivoting insertion floor, the insertion floor must be folded up and held in this position by locking and holding elements. For this, usually additional locking elements or gas pressure dampers are used above and/or at the side of the storage or luggage compartment.

However, these solutions are cost-intensive and consist of a number of components needing to be installed, which has a negative impact on the mounting time. Furthermore, no easy mounting and dismounting of the insertion floor by the user is possible in vehicles with gas pressure dampers.

Therefore, the problem which the present invention proposes to solve is to create an insertion floor for covering a storage or luggage compartment, preferably in a motor vehicle, wherein the insertion floor is pivotably supported on a holder by way of locking hinges and wherein the locking hinges hold the insertion floor at least in a position in which the storage or luggage compartment is accessible. The novel insertion floor can be economically produced, consists of few individual parts, and also can be installed and removed quickly and easily by the user.

This problem is solved according to the invention with an insertion floor for covering a storage or luggage compartment, preferably in a motor vehicle, wherein the insertion floor is pivotably supported on a holder by way of locking hinges and wherein the locking hinges hold the insertion floor at least in a position in which the storage or luggage compartment is accessible, in that the insertion floor can be removed from the holder.

In accordance with this embodiment, the inventive insertion floor can be easily and quickly mounted and removed by the user. Furthermore, the number of components is reduced, which leads to a reduction in costs and assembly time.

According to one advantageous embodiment, the locking hinge has a hinge body and a hinge axis, and the hinge body is arranged on the insertion floor and the hinge axis on the holder.

According to an alternative embodiment, the locking hinge has a hinge body and a hinge axis, and the hinge body is arranged on the holder and the hinge axis on the insertion floor.

The mounting and removal of the insertion floor is especially fast and easy when, according to a preferred embodiment, the hinge body is removable from the hinge axis.

For this, advantageously the hinge body is provided with at least one open hinge eyelet, which can be clipped onto the hinge axis.

In order to hold the insertion floor at least in a position accessible to the storage or luggage compartment, according to a preferred embodiment a locking arm is arranged on the hinge body.

According to one advantageous modification, the hinge body is provided with two open hinge eyelets and the locking arm is arranged between the two hinge eyelets.

The locking arm may advantageously be formed as a single piece with the hinge body.

The locking arm interacts advantageously with a spring element which is arranged on the holder. By way of this spring element, the insertion floor can be held in the open position.

The spring element is advantageously formed by a leaf spring.

According to one advantageous modification, the spring element is secured by its one end to the holder and, at its other end, it has a locking recess to hold a free end of the locking arm.

According to an alternative embodiment, the spring element is secured by its one end to the holder and, at its other end, it has a locking lug for engaging in a locking recess, which is arranged in the area of the free end of the locking arm.

According to one advantageous modification, an opening is provided between the two hinge eyelets, which opening allows access to a lashing eye. Thus, the locking hinge may have, besides a function of holding open the insertion floor, also a load bearing function in that it can be used for lashing cargo in the vehicle.

The opening is advantageously closable with a cover.

Other objects, advantages and novel features of the present invention will become apparent from the following detailed description of one or more preferred embodiments when considered in conjunction with the accompanying drawings.

DETAILED DESCRIPTION OF THE DRAWINGS

In FIGS. 1 to 8, a first embodiment of the insertion floor 1 according to the invention in different representations is shown in the opened and closed state.

The insertion floor 1 may serve, for example, to cover a spare wheel cavity (not shown) in a motor vehicle.

The insertion floor 1 consists of a substantially flat plate, which may have for example a substantially rectangular shape. In a front area of the insertion floor 1 there is provided a grip 2 or the like, by which the insertion floor 1 can be pivoted about locking hinges 3, which are arranged in the rear area of the insertion floor 1. The locking hinges 3 are connected on the one hand to the insertion floor 1 and on the other hand to a holder 4, which is arranged e.g. on the bodywork of the motor vehicle.

In the sample embodiment shown, two spaced apart locking hinges 3 are shown, but there may also be provided more—e.g., in the case of a large insertion floor 1—or also fewer locking hinges 3—e.g., in the case of a small insertion floor 1.

Figure 1:
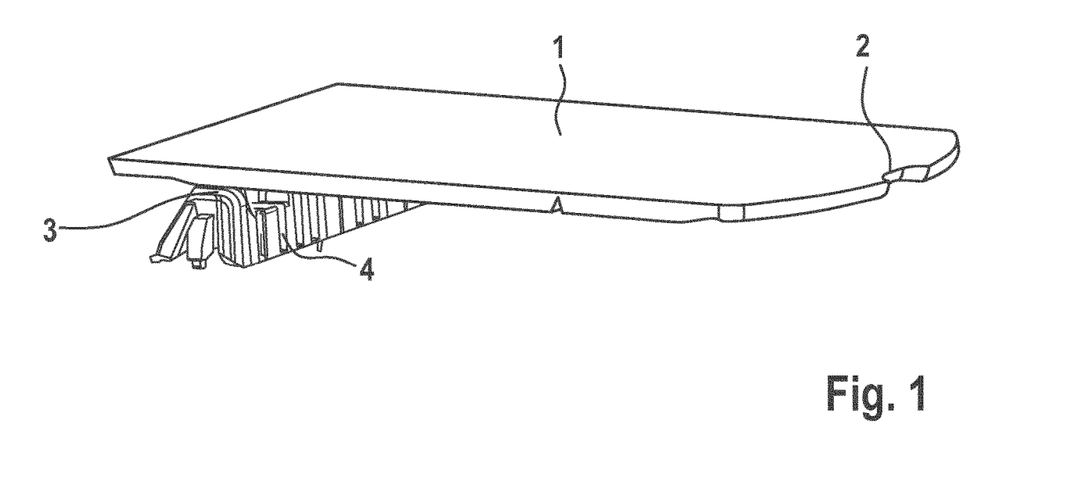
FIGS. 1 to 8 are different representations of an insertion floor according to the invention in a first embodiment.
Figure 2:
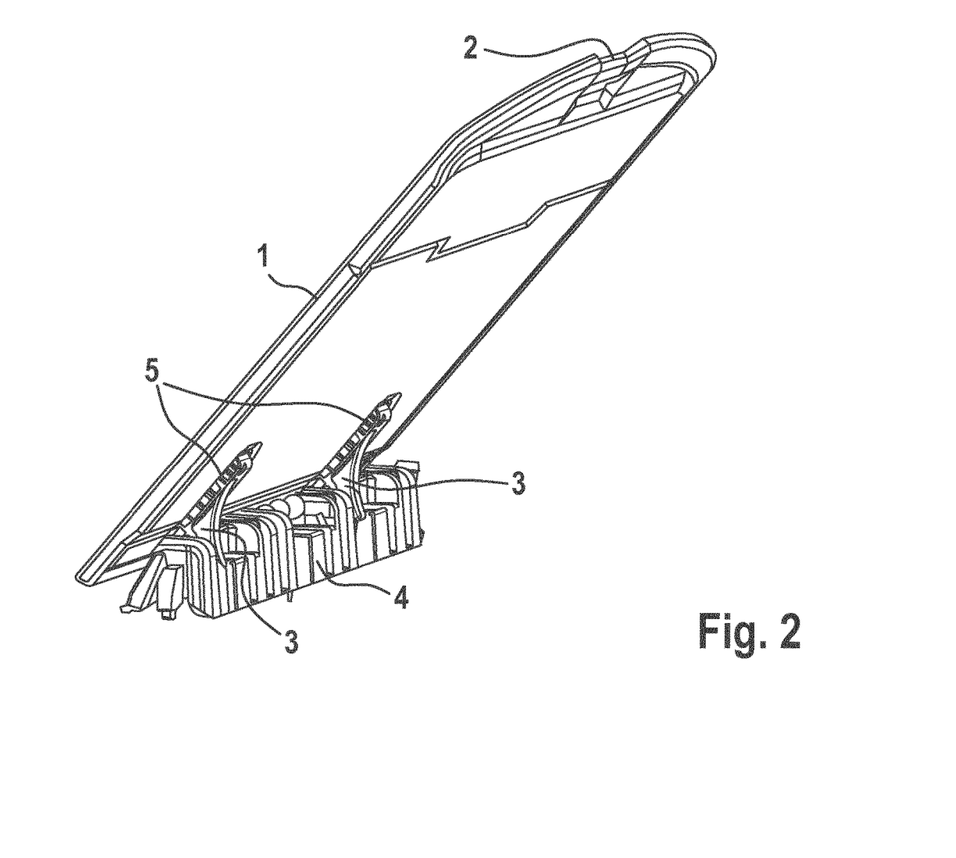
Figure 3:
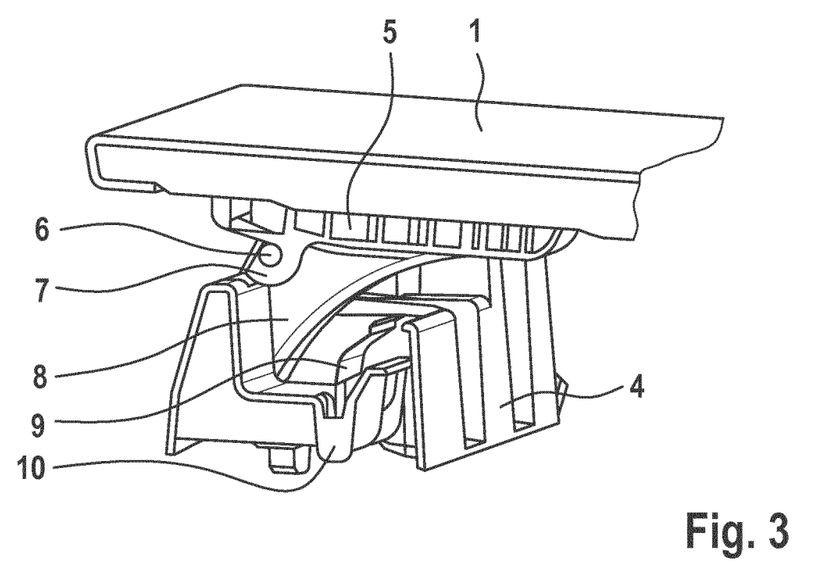
Figure 4:
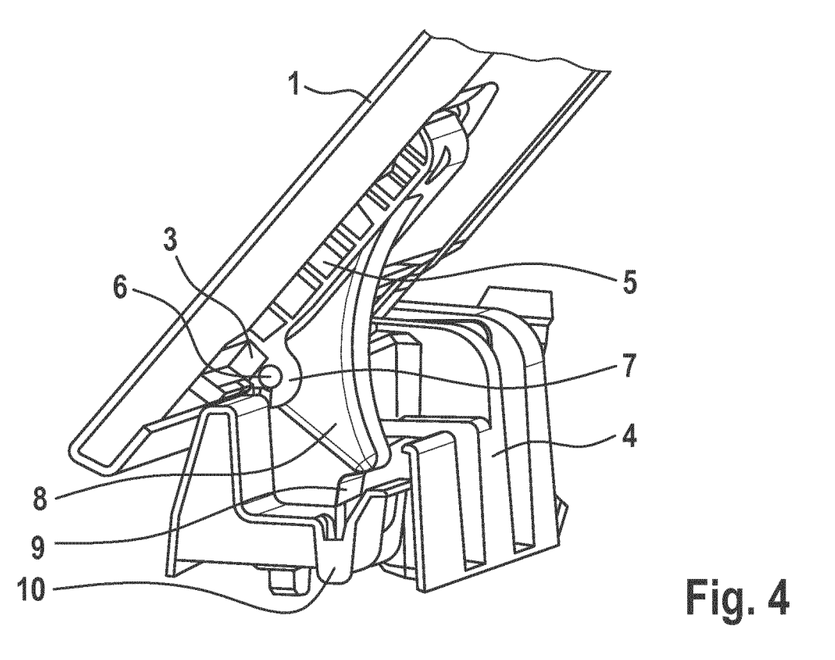
Figure 5:
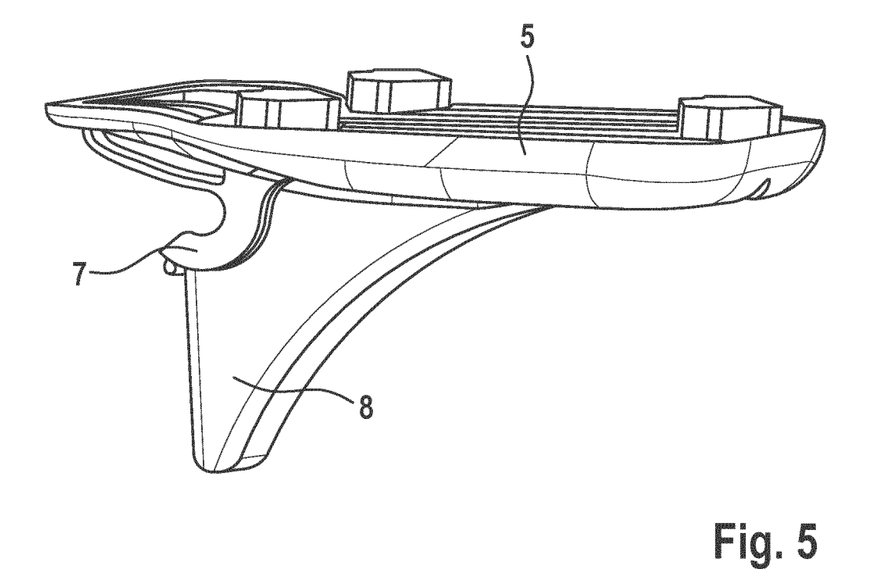
Figure 6:
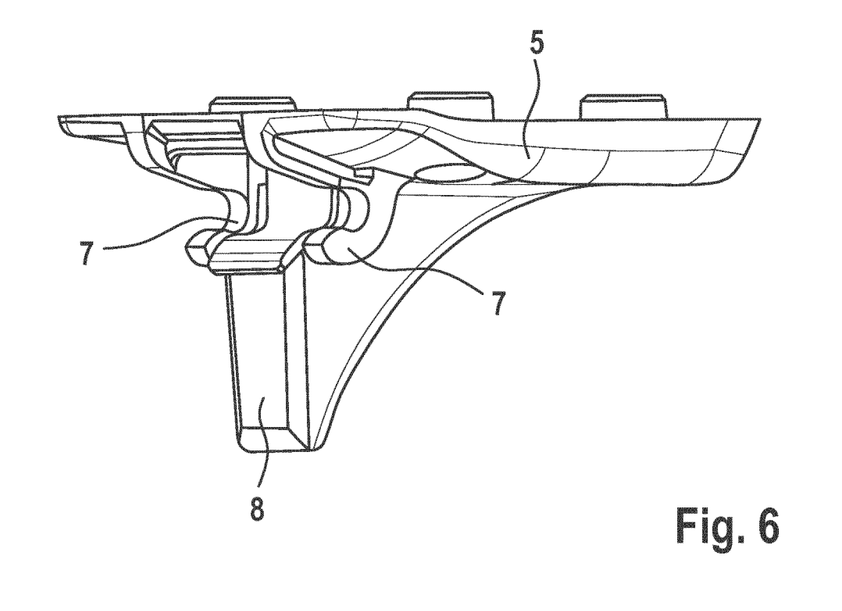
Figure 7:
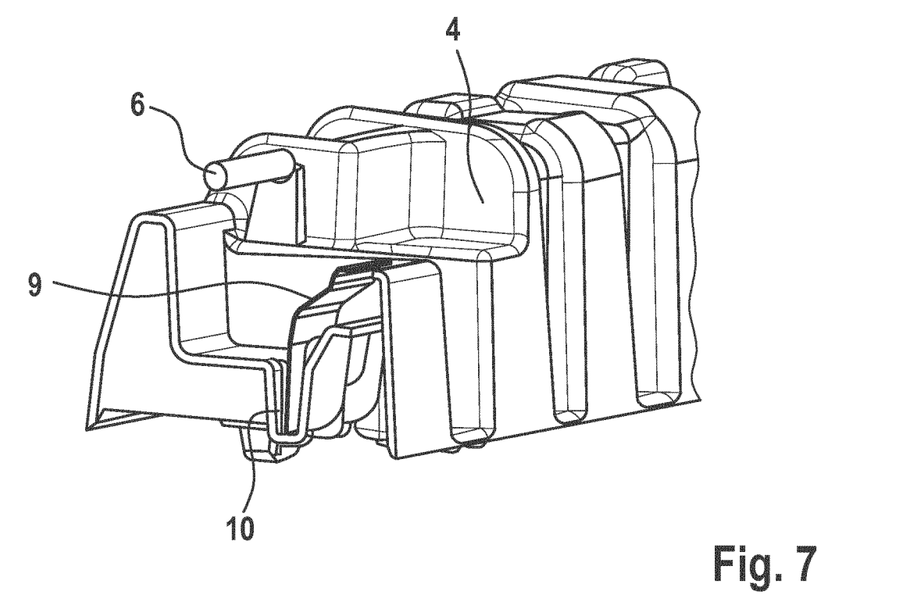
Figure 8:
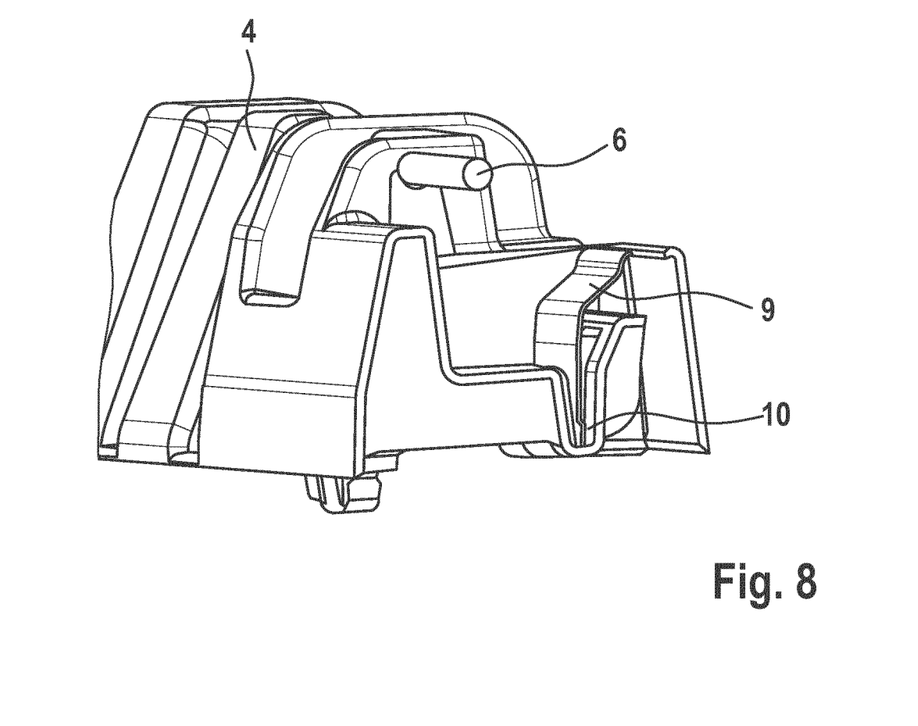
Figure 9:
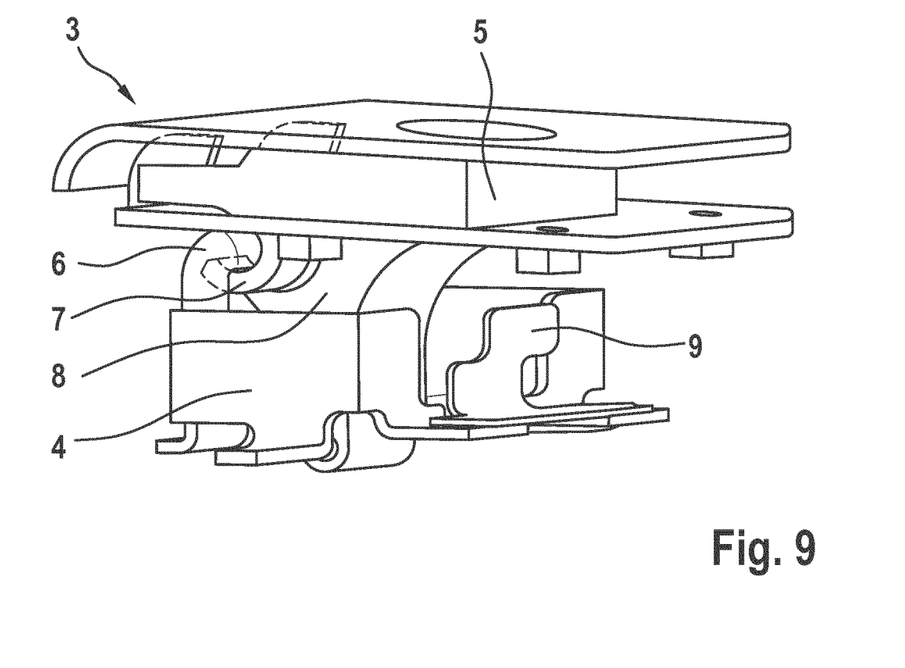
FIGS. 9 to 13 are different representations of an insertion floor according to the invention in a second embodiment.
Figure 10:
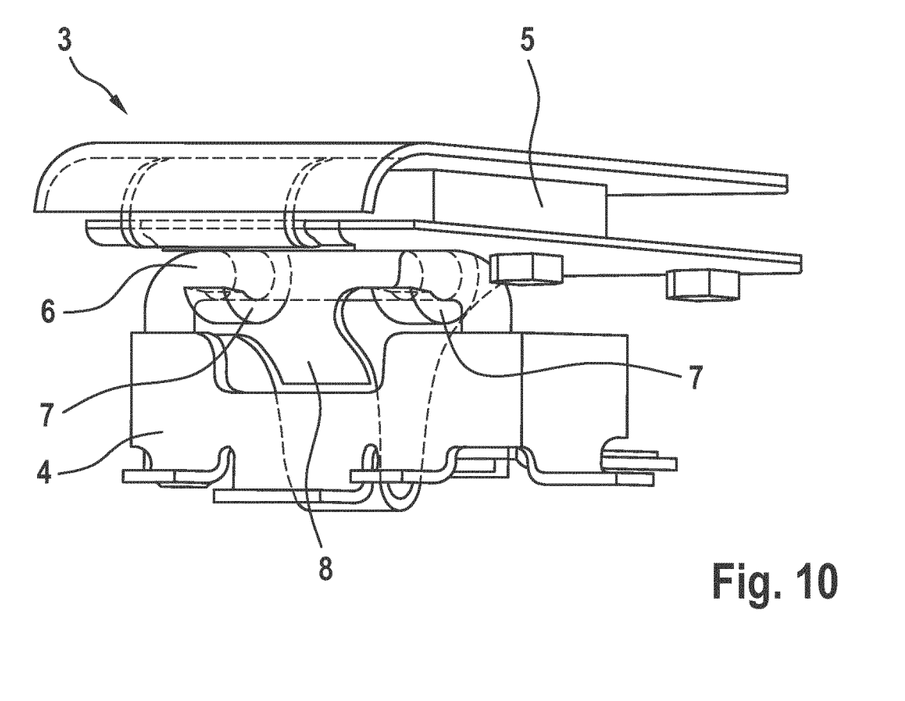
Figure 11:
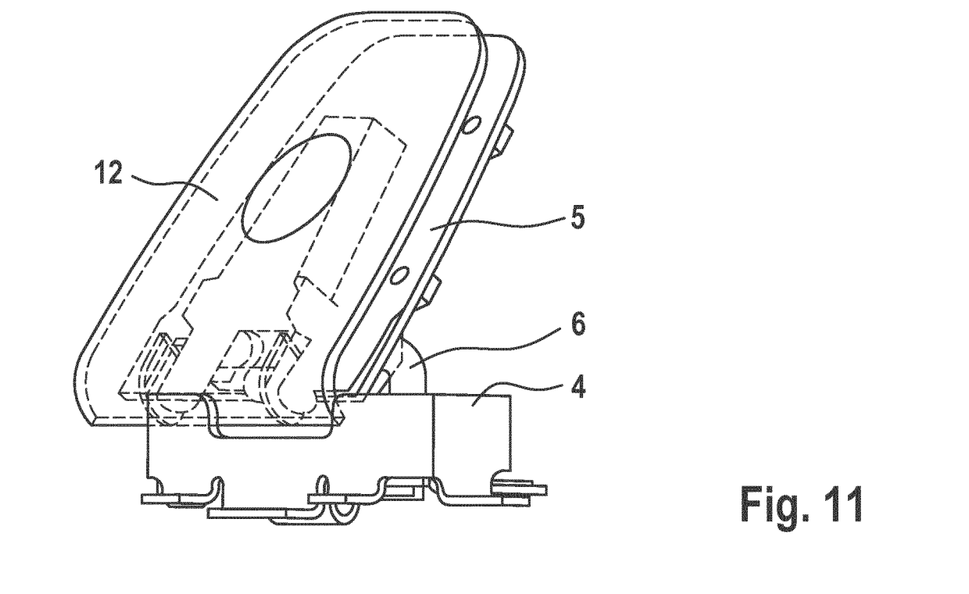
Figure 12:
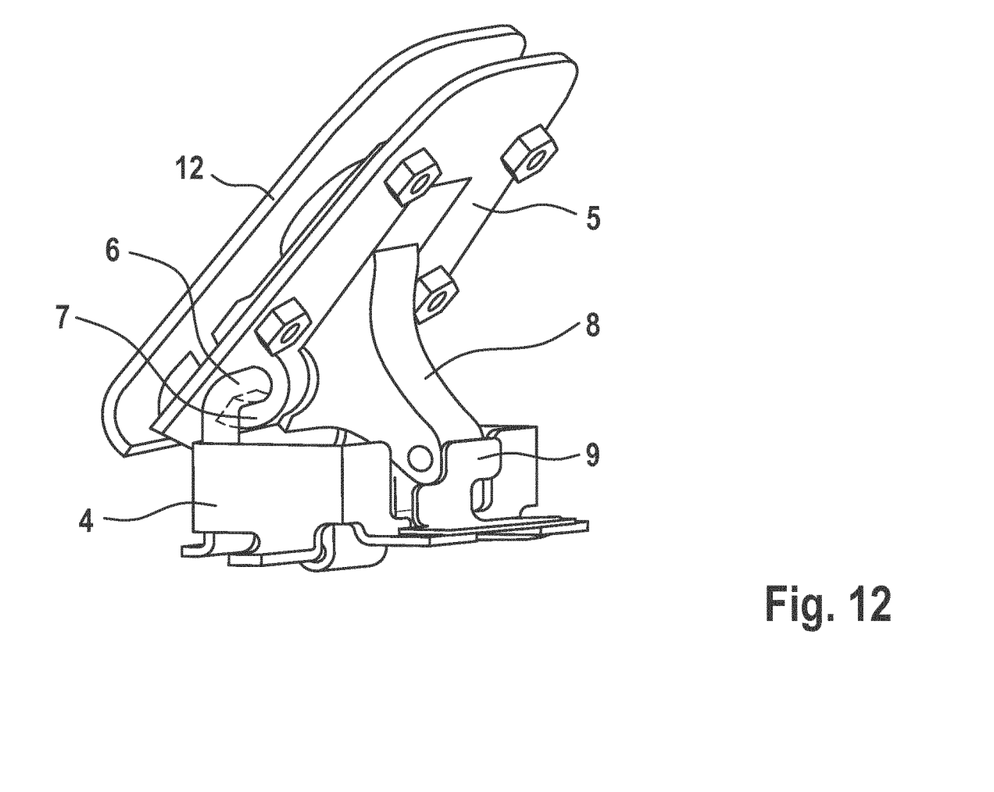
Figure 13:
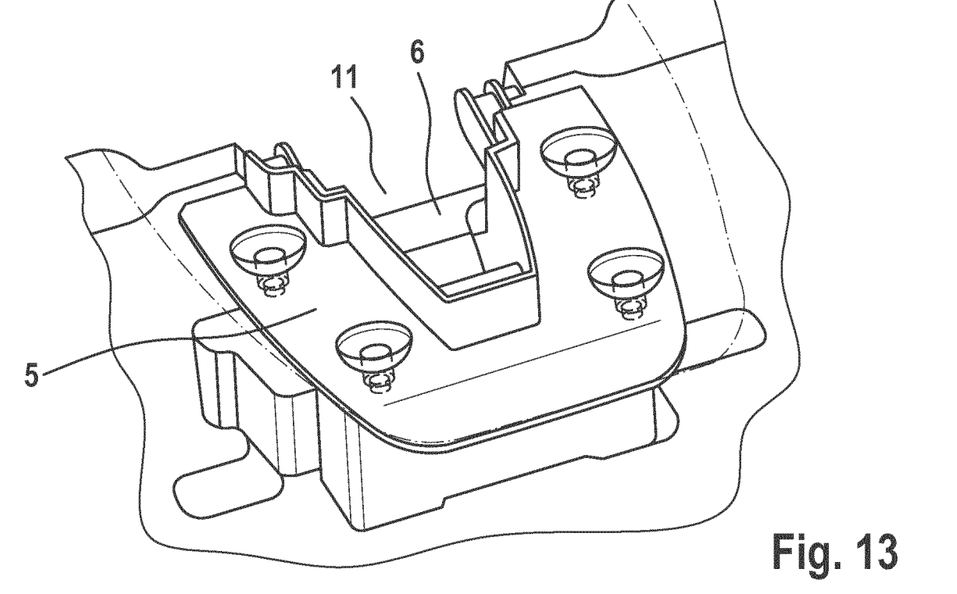

FIG. 1 shows the insertion floor 1 in a position closing the spare wheel cavity, while FIG. 2 shows a position 1 opening up the spare wheel cavity. In the opened position shown in FIG. 2, the insertion floor 1 is held by the locking hinge 3, so that an access to the spare wheel cavity is possible.

The locking hinges 3 are designed so that the insertion floor 1 can be quickly and easily removed by the user and also put back again.

The two locking hinges 3 have the same design, so that in the following only one locking hinge 3 will be described and explained.

The locking hinge 3, which is manufactured for example as an injection molded part, has a hinge body 5, which can pivot about a hinge axis 6.

The arrangement is such that the hinge body 5 is arranged on the insertion floor 1 and the hinge axis 6 on the holder 4. Basically, however, an embodiment is also contemplated in which the hinge body 5 is arranged on the holder 4 and the hinge axis 6 on the insertion floor 1.

The holder 4 and the hinge axis 6 can be made of metal, such as steel. In this case, holder 4 and hinge axis 6 may be separate components, which are joined together in a suitable manner. However, the holder 4 may also be made as an injection molded part. In this case, holder 4 and hinge axis 6 may be joined together as a single piece. Furthermore, it is possible to make the holder 4 as an injection molded part and the hinge axis 6 as a metal insert part.

In order to remove the insertion floor 1, the hinge body 3 can be taken off of the hinge axis 6. For this, the hinge body 5 is provided with two spaced apart and open hinge eyelets 7, which can be clipped onto the hinge axis 6; that is, the opening of the hinge eyelet 7 has an aperture which is smaller than the diameter of the hinge axis 6, so that when the insertion floor 1 is placed on or taken off of the holder 4 the hinge eyelet 7 is widened in order to pass over the hinge axis 6.

Alternatively, the hinge axis 6 may also be provided with two oppositely situated flats, so that in a particular mutual position of hinge body 5 and hinge axis 6 the insertion floor 1 can be placed on or taken off of the hinge axis 6 without widening the hinge eyelet 7.

In order to fix the insertion floor 1 in its open position, there is arranged on the hinge body 5 a locking arm 8, which is arranged between the two hinge eyelets 7 and protrudes substantially perpendicular from the hinge body 5 in the direction of the holder 4. The locking arm 8 may be formed as a single piece with the hinge body 5 or also be connected in another suitable manner to the hinge body 5.

The locking arm 8 interacts with a spring element 9, which is arranged on the holder 4 and formed as a leaf spring. In the open state of the insertion floor 1, the locking arm 8 interlocks with the spring element 9 and thus holds the insertion floor 1 in a position in which the storage or luggage compartment is freely accessible.

In the first sample embodiment of FIGS. 1 to 8, the spring element 9 is secured by its one end in a pocket 10 of the holder 4. At its other end there is provided a locking recess, in which the free end of the locking arm 8 engages in the open position of the insertion floor 1 and securely locks the insertion floor 1.

In the second embodiment shown in FIGS. 9 to 13, the spring element 9 is not arranged in a pocket of the holder 4, but instead is firmly connected to the holder 4, e.g., by welding, gluing, screw fastening, or the like.

Furthermore, in this embodiment, an opening 11 is provided between the two hinge eyelets 7, which enables access to a lashing eye (not shown). Thus, the holder 4 may take on two functions, namely, "holding the insertion floor 1" and "lashing in the vehicle".

The opening 11 between the two hinge eyelets 7 may be closed by way of a cover 12 if need be.

FIGS. 14 to 17 show a third embodiment, which can be used especially when not enough space is available for the installing of an insertion floor 1 according to the first or second embodiment.

In this third embodiment, the locking arm 8 does not protrude substantially perpendicular from the hinge body 5 in the direction of the holder 4, as in the embodiments of FIGS. 1 to 13, but instead it has a curved profile, the center of the arc lying roughly in the area of the hinge axis 6. In this way, the locking arm 8 takes up less room.

Furthermore, the spring element 9 which is secured by its one end to the holder 4 has at its other end a locking lug for engaging in a locking recess which is arranged in the area of the free end of the locking arm 8. Thus, in this embodiment as well, the insertion floor 1 may be held securely in the open position (see FIGS. 16 and 17).

Figure 14:
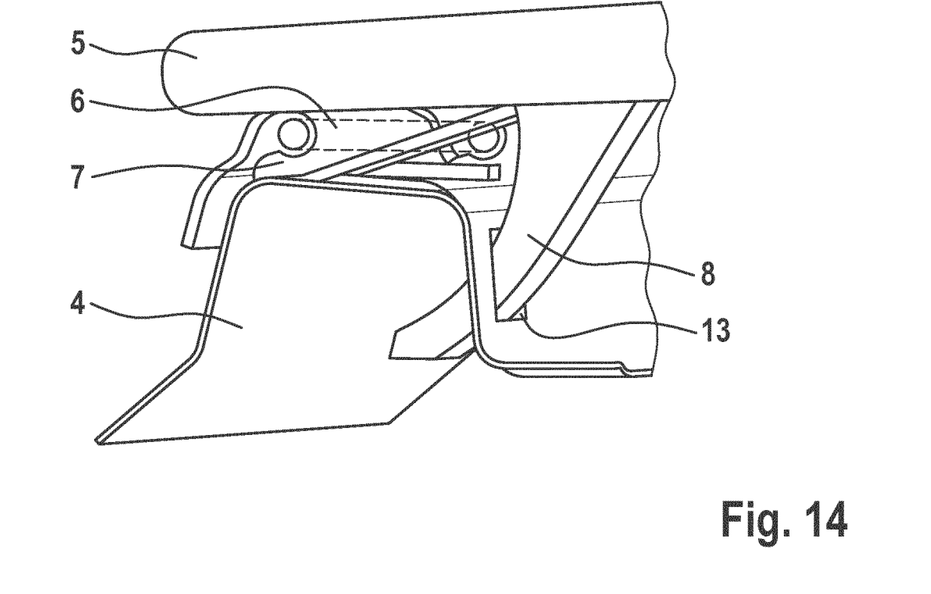
FIGS. 14 to 17 are different representations of an insertion floor according to the invention in a third embodiment.
Figure 15:
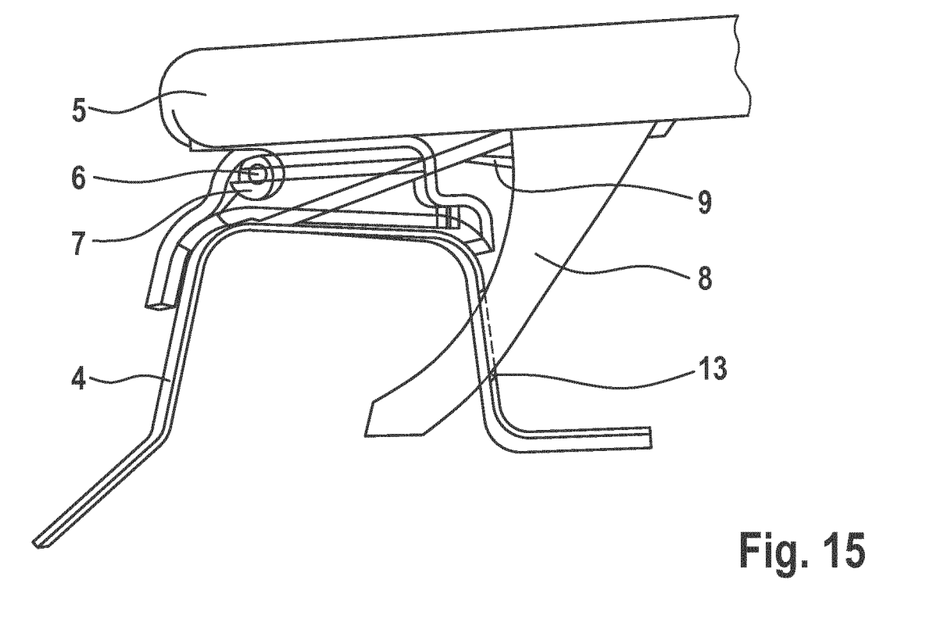
Figure 16:
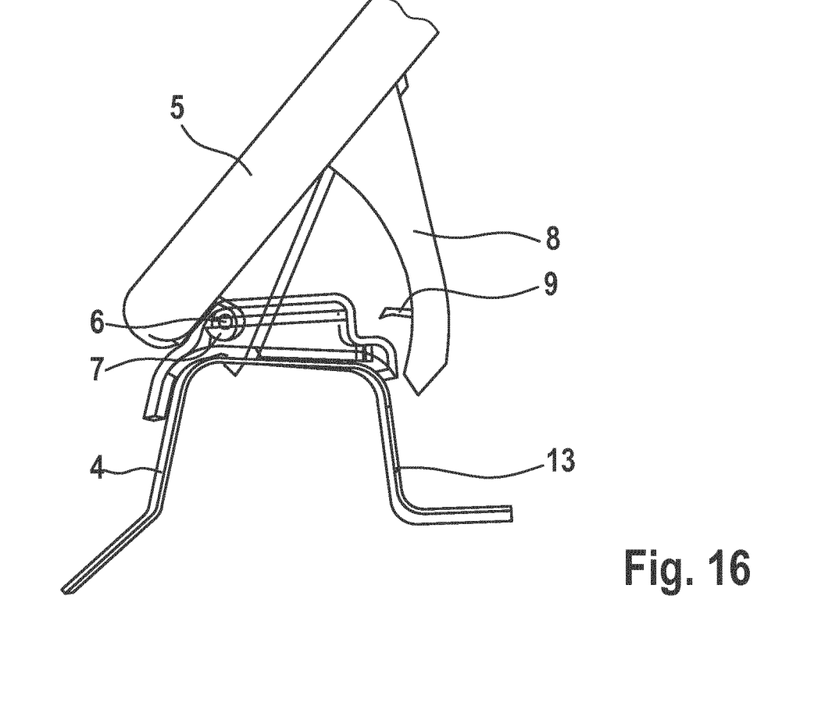
Figure 17:
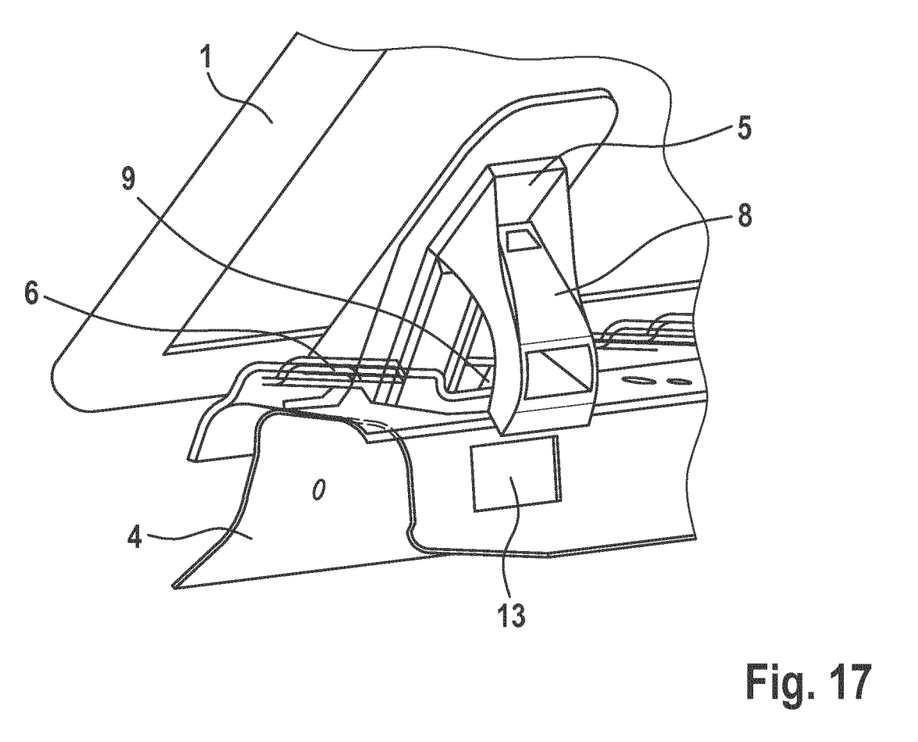

So that the locking arm 8 during the closing of the insertion floor 1 does not collide with the holder 4, a through opening 13 is provided in the holder 4, through which the locking arm 4 passes in the closed state (see FIGS. 14 and 15).

The preceding description of the present invention serves only for illustrative purposes and not for the purpose of limiting the invention. Various changes and modifications are possible in the context of the invention without leaving the scope of the invention or its equivalents.

LIST OF REFERENCE NUMBERS

1 Insertion floor
2 Grip
3 Locking hinge
4 Holder
5 Hinge body
6 Hinge axis
7 Hinge eyelet
8 Locking arm
9 Spring element
10 Pocket
11 Opening
12 Cover
13 Through opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for covering a storage or luggage compartment in a motor vehicle, comprising:

an insertion floor;

a holder;

locking hinges by which the insertion floor is pivotably supported on the holder, wherein the locking hinges hold the insertion floor at least in a position in which the storage or luggage compartment is accessible, the insertion floor is configured to be removable from the holder, and the locking hinges hold the insertion floor at least in a non-horizontal or non-vertical open position in which the storage or luggage compartment is accessible.

2. The apparatus as claimed in claim 1, wherein
each locking hinge has a hinge body and a hinge axis, and
the hinge body is arranged on the insertion floor and the hinge axis on the holder.

3. The apparatus as claimed in claim 1, wherein
each locking hinge has a hinge body and a hinge axis, and
the hinge body is arranged on the holder and the hinge axis on the insertion floor.

4. The apparatus as claimed in claim 2, wherein
the hinge body is removable from the hinge axis.

5. The apparatus as claimed in claim 3, wherein
the hinge body is removable from the hinge axis.

6. The apparatus as claimed in claim 2, wherein
the hinge body is provided with at least one open hinge eyelet, which is clipped onto the hinge axis.

7. The apparatus as claimed in claim 3, wherein
the hinge body is provided with at least one open hinge eyelet, which is clipped onto the hinge axis.

8. The apparatus as claimed in claim 2, wherein
a locking arm is arranged on the hinge body.

9. The apparatus as claimed in claim 3, wherein
a locking arm is arranged on the hinge body.

10. The apparatus as claimed in claim 8, wherein
the hinge body is provided with two open hinge eyelets, and
the locking arm is arranged between the two hinge eyelets.

11. The apparatus as claimed in claim 9, wherein
the hinge body is provided with two open hinge eyelets, and
the locking arm is arranged between the two hinge eyelets.

12. The apparatus as claimed in claim 8, wherein
the locking arm is formed as a single piece with the hinge body.

13. The apparatus as claimed in claim 8, wherein
the locking arm interacts with a spring element which is arranged on the holder.

14. The apparatus as claimed in claim 13, wherein
the spring element is a leaf spring.

15. The apparatus as claimed in claim 13, wherein
the spring element is secured at one end to the holder and, at the other end, it has a locking recess to hold a free end of the locking arm.

16. The apparatus as claimed in claim 13, wherein
the spring element is secured at one end to the holder and, at the other end, it has a locking lug for engaging in a locking recess, which locking recess is arranged in an area of a free end of the locking arm.

17. The apparatus as claimed in claim 10, wherein
an opening is provided between the two open hinge eyelets, which opening allows access to a lashing eye.

18. The apparatus as claimed in claim 17, wherein the opening is closed with a cover.

\* \* \* \* \*